(No Model.)

W. F. POIESZ.
MARBLE COUNTERSINKING AND MOLDING MACHINE.

No. 349,000. Patented Sept. 14, 1886.

WITNESSES:
Geo Eakins
C. E. Busby

INVENTOR
Wil. F. Poiesz.
Wm. H. Finckel
ATTORNEY.

N. PETERS. Photo-Lithographer, Washington, D. C.

UNITED STATES PATENT OFFICE.

WILLIAM F. POIESZ, OF PHILADELPHIA, PA., ASSIGNOR TO HENRY B. RIEHLÉ AND FREDERICK A. RIEHLÉ, BOTH OF SAME PLACE.

MARBLE COUNTERSINKING AND MOLDING MACHINE.

SPECIFICATION forming part of Letters Patent No. 349,000, dated September 14, 1886.

Application filed March 25, 1885. Serial No. 160,094. (No model.)

*To all whom it may concern:*

Be it known that I, WILLIAM F. POIESZ, a citizen of the United States, residing at Philadelphia, in the county of Philadelphia and State of Pennsylvania, have invented a new and useful Improvement in Marble-Countersinking Machines, of which the following specification is a full, clear, and exact description.

My invention relates to making the rotary movement of the table automatic, and also to the use of clutches for throwing the feed in and out of gear.

The object of my invention is, in the case of the automatic rotary feed, to insure a steadier and more efficient feed than could be obtained by hand, and allow the operator to devote his attention to other parts of the machine and the work being done, and, referring to the clutches, the improvement secures great durability in wear and quickness in operation. I attain these objects by the mechanism illustrated in the accompanying drawings, in which—

Figure 1:
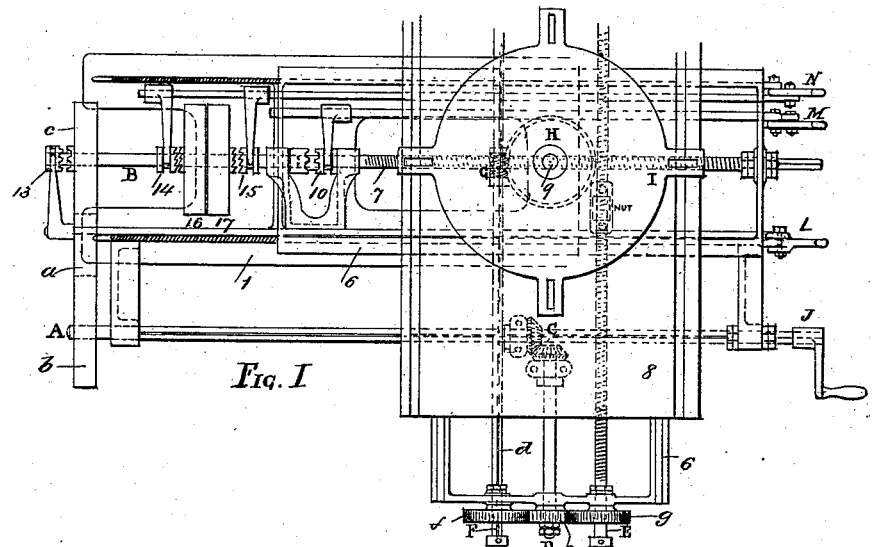
Figure 2:
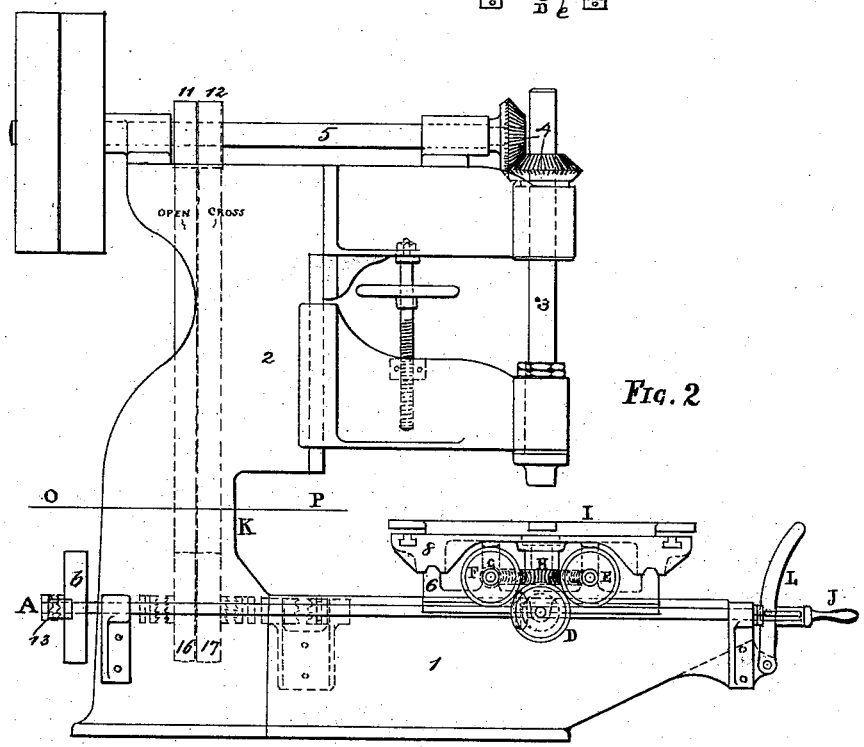

Figure 1 is a top plan view of the feed-movement of the tables, taken in the plane of line O P, Fig. 2; and Fig. 2 is a side elevation of the machine.

Similar letters refer to like parts in the two views.

The frame-work 1 may be of approved construction, and has the standard 2, in which the tool-spindle 3 is secured and driven by gearing 4 from the main power-shaft 5. The sub-carriage 6 is mounted upon ways longitudinal of the frame-work and traversed thereon by the screw-shaft 7. This sub-carriage receives in crossways on it the carriage 8, which is engaged by a screw-shaft, E, to move said carriage crosswise of the sub-carriage, and upon a vertical post, 9, of the carriage 8 is mounted the table I, which receives the material to be worked. The longitudinal movement of the table is effected through the feed-screw shaft 7, operated by the main feed-shaft B and connecting-clutch 10 and clutch rod and lever M. The fixed member of the clutch 10 is socketed at its rear end to receive the front end of the shaft B, and this shaft B is driven forwardly and reversely from shaft 5 by open and cross belts 11 12, respectively, on suitable pulleys. A shaft, A, is borne by the frame parallel with shaft B, and is driven from the latter by belt $a$ on pulleys $b$ $c$, and this shaft A drives, by bevel-gearing C, a counter-shaft, D, carried by the sub-carriage 6. In this sub-carriage and parallel with shaft D is the screw-shaft E, engaging the carriage 8 and the shaft F, having the worm G, movable thereon longitudinally, but rotated thereby by its spline or feather $d$. This worm engages the worm-wheel H of the table I, and slips along its shaft as said table is traversed crosswise of the machine. That member of the gearing C which is on the shaft A is arranged to slip on said shaft (being secured by a spline or feather) as the table is moved longitudinally of the frame. The shafts E F are driven from shaft D by a spur-wheel, $e$, meshing with toothed wheels $f$ $g$. The shaft F may be stopped at will, so as to prevent rotation of table I, by any suitable common device for moving its wheel $f$ out of gear with the spur-wheel $e$. The pulley $c$ on shaft B is loose thereon, and rendered operative to drive the shaft A by a clutch, 13, actuated by a rod and lever, L, and when it is desired to feed the carriage by hand this clutch 13 is operated to disengage the pulley $c$ and let it run free. Clutches 14 and 15, operated by rod and lever N, serve to engage the open and cross belt pulleys 16 and 17 with the shaft B, as the said shaft is to be driven forward or reversed from the shaft 5, which always runs in the same direction. The gears $e$ and $f$ require to be disengaged but seldom, and are therefore not liable to undue wear.

The control of the different feeds of these machines as heretofore constructed, by levers in front, requires a constant shifting in and out of gear-wheels at that point. When gear-wheels are suddenly engaged, the ends of the teeth are liable to fracture, which is not the case with the clutches; also, if the gears do not strike into mesh immediately, time is consumed and the teeth damaged.

The recess shown in the frame at K admits of the full movement of the outer edge of the table to the center of the spindle, which is not the case in previous machines, so far as I know.

I am aware that a machine of this general character and for this purpose has been constructed and used for many years; but my experience has demonstrated that the above improvements are of material benefit for the better and more economical operation of the same.

I do not claim in a marble molding and countersinking machine the frame, a sub-carriage mounted thereon, a screw-shaft for traversing said sub-carriage longitudinally of the frame, a power-shaft, and means to connect said screw-shaft with and disconnect it from said power-shaft, and a hand-operating lever connected with said screw-shaft, combined with a carriage mounted upon said sub-carriage, and means to traverse it thereon.

What I claim is—

1. In a marble molding or countersinking machine, the table I, provided with the worm-wheel H, combined with the worm G, shaft F, upon which it is free to slide lengthwise and by which it is rotated, the shaft A, driven from the main driving-shaft, and connections between the shafts A and F, substantially as described.

2. In a marble molding or countersinking machine, the combination, with the work-table, of its carriage upon which it is rotarily mounted, a feed-shaft connected to said table to rotate it, a feed-shaft connected to said carriage to move it transversely of the machine, a sub-carriage upon which the carriage is mounted, a feed-shaft to move it longitudinally of the machine, a frame-work to support these parts, gearing connecting said several feed-shafts and connections with a source of power, and independent clutches engaging said feed-shafts, and hand-levers to operate them to render said feed-shafts or any of them operative or inoperative at will to control the feed of the table, carriage, and sub-carriage, substantially as described.

3. In a marble molding or countersinking machine, the combination, with the work-table, of its carriage upon which it is mounted, a worm-wheel on said table, and worm-shaft on the carriage to rotate said table, adapted to be rendered operative or inoperative at will, a feed-shaft connected to said carriage for traversing it crosswise of the machine in either direction, a sub-carriage mounted upon the frame-work of the machine, and having a feed-shaft adapted to be connected with or disconnected from the source of motion, a driving-shaft connected with the several feed-shafts, and interposed means for rendering said feed-shafts operative or inoperative at will, substantially as described.

4. The combination of the frame-work, sub-carriage mounted thereon and provided with a feed-screw, carriage mounted on said sub-carriage, and feed-screw for it, a table arranged upon the carriage and provided with a worm-wheel and worm-shaft, and the operating mechanism therefor, consisting of the shafts A and D, gearing C and $e f g$, shaft B, belted to shaft A, and driven in either direction from the main shaft 5, the clutch 13 and its lever L, for rendering the shafts A operative or inoperative, the clutch 10, operated by lever M, for rendering the shaft 7 operative or inoperative, and the clutches 14 and 15 and lever N, for reversing the motion of the parts, substantially as described.

WIL. F. POIESZ.

Witnesses:
JOHN SPARHAWK, Jr.,
WILLIAM A. BAKER.